United States Patent [19]
Wagner et al.

[11] Patent Number: 4,942,858
[45] Date of Patent: Jul. 24, 1990

[54] CYLINDER HEAD FOR AIR-COMPRESSING, SELF-IGNITION INTERNAL COMBUSTION ENGINES

[75] Inventors: Wolf-Dietrich Wagner, Stuttgart; Rolf Klumpp, Kernen; Wolfgang Strobel, Remshalden; Günter Brenker, Waiblingen, all of Fed. Rep. of Germany

[73] Assignee: Daimler-Benz AG, Fed. Rep. of Germany

[21] Appl. No.: 347,057

[22] Filed: May 4, 1989

[30] Foreign Application Priority Data

Jun. 9, 1988 [DE] Fed. Rep. of Germany ....... 3819656

[51] Int. Cl.$^5$ .......................... F02F 1/42; F02F 1/36; F02B 19/16; F01P 3/16
[52] U.S. Cl. ............................ 123/193 H; 123/275; 123/41.82 R
[58] Field of Search ............ 123/193 H, 41.82 R, 123/275, 254

[56] References Cited

U.S. PATENT DOCUMENTS

| 3,814,067 | 6/1974 | De La Fuente | 123/275 |
| 4,034,720 | 7/1977 | Noguchi et al. | 123/275 |
| 4,123,902 | 11/1978 | Iida | 123/193 H |
| 4,304,199 | 12/1981 | Formia et al. | 123/41.82 R |
| 4,418,655 | 12/1983 | Henning | 123/41.82 R |
| 4,433,647 | 2/1984 | Muller | 123/275 |
| 4,453,527 | 6/1984 | Wade | 123/193 H |
| 4,622,941 | 11/1986 | Le Creurer et al. | 123/193 H |

FOREIGN PATENT DOCUMENTS 0062143 6/1982 European Pat. Off. .

Primary Examiner—Willis R. Wolfe
Assistant Examiner—M. Macy
Attorney, Agent, or Firm—Evenson, Wands, Edwards, Lenahan & McKeown

[57] ABSTRACT

A cylinder head for air-compressing, self-ignition fuel-injection internal combustion engines has four valves per cylinder and an auxiliary combustion chamber between the inlet ducts of the inlet valves. In order to achieve a structurally stiff inclusion of the auxiliary combustion chamber in the cylinder head housing, the cylinder head top located between a coolant space and a control space is set at an angle in the transverse direction in such a way that the auxiliary combustion chambers are immediately adjacent to the cylinder head top and can be cast jointly with the cylinder head.

5 Claims, 1 Drawing Sheet ical Patent Specification (EP-PS) 00 62 143

CYLINDER HEAD FOR AIR-COMPRESSING, SELF-IGNITION INTERNAL COMBUSTION ENGINES

BACKGROUND AND SUMMARY OF THE INVENTION

The present invention generally concerns a cylinder head for air-compressing, self-ignition internal combustion engines with several cylinders, and more particularly to such a cylinder head constructed so that a structurally stiff inclusion of an auxiliary combination chamber is achieved.

European Patent Specification (EP-PS) 00 62 143 discloses connecting auxiliary combustion chambers on the inside of a sidewall of the cylinder head housing in a cylinder head of above-noted general type of construction. It does not provide a further connection to the top of the cylinder head, which runs substantially parallel to the bottom of the cylinder head. In consequence, the auxiliary combustion chamber does not substantially contribute to the structural stiffness of the cylinder head.

Accordingly, an object of the present invention is to construct a cylinder head in such a way that a structurally stiff inclusion of the auxiliary combustion chamber is achieved in the cylinder head housing.

It is another object of the present invention to provide a compact cylinder head structural shape in association with simple assembly.

The invention achieves these and other objects by constructing the cylinder head so that the auxiliary combustion chambers are immediately adjacent to a cylinder head top.

Because of the shaping of the cylinder head provided by certain preferred embodiments of the present invention, the bottom of the cylinder head and the top of the cylinder head are joined to form a composite casting by the housings of auxiliary combustion chambers. By this arrangement, the auxiliary chambers are stiffened and, simultaneously, the housings of the auxiliary combustion chambers act as support columns by which the cylinder head housing is in itself further stiffened. Because of the support column effect of the chambers, it is possible to arrange these in a substantially isolated manner in the coolant space so that at least good cooling of the upper part of the chambers is achieved by the flow of coolant around them on all sides.

In addition, the connection locations between the top of the cylinder head and the auxiliary combustion chambers are suitable for accepting a tapped hole for an injection nozzle, which can therefore be located within the outline of the housing so that a compact cylinder head design is achieved. Moreover, the fact that the top of the cylinder head is at an angle achieves good drainage of the lubricating oil from the control space into the crank case.

A compact design of the cylinder head is achieved by positioning the tapped holes for the injection nozzle at an angle.

Moreover, depressions in the wall housing above the auxiliary combustion chambers form recesses for receiving the injection nozzles in an isolated manner to provide good access to the injection nozzles from the outside, which substantially simplifies assembly and maintenance work.

Other objects, advantages and novel features of the present invention will become apparent from the following detailed description of the invention when considered in conjunction with the accompanying drawings.

DETAILED DESCRIPTION OF THE DRAWINGS

Figure 1:
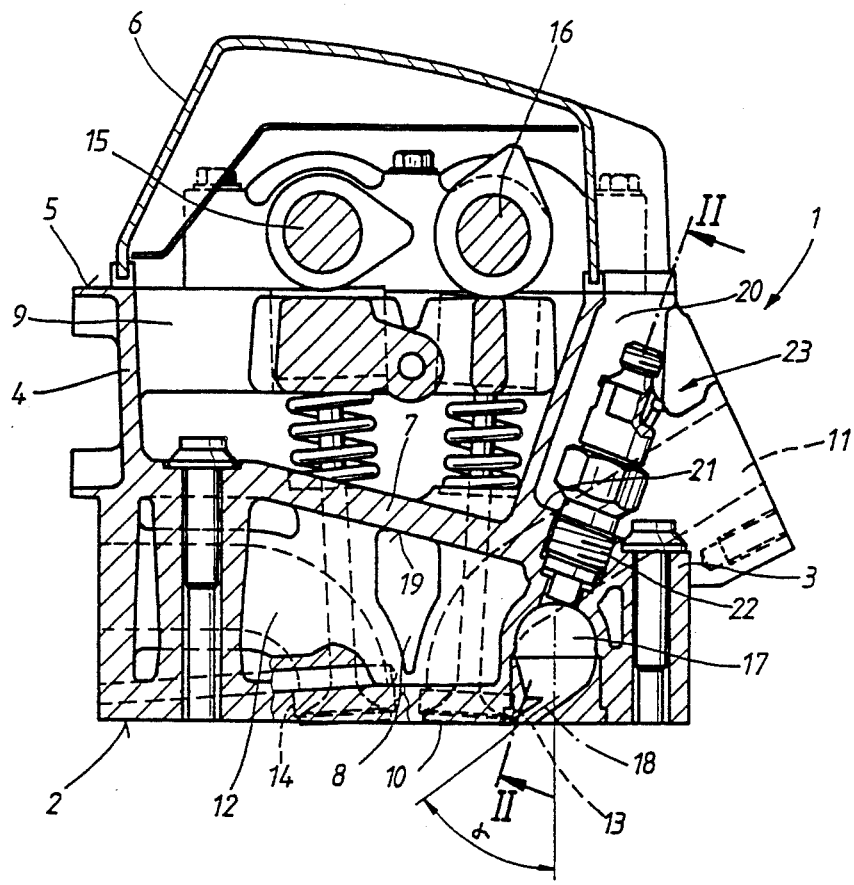
FIG. 1 shows a cylinder head according to one embodiment of present invention in a cross-sectional view taken through an auxiliary combustion chamber.
Figure 2:
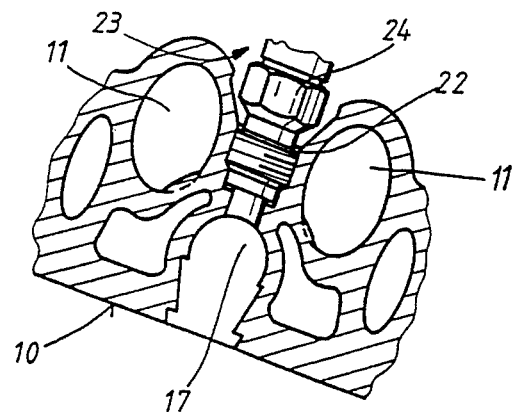
FIG. 2 shows the auxiliary combustion chamber of FIG. 1 in a longitudinal partial section along the line II—II of FIG. 1.

A cylinder head 1 for an air-compressing, self-ignition internal combustion engine with several cylinders is illustrated in FIG. 1 with a cylinder head bottom 2 framed by housing walls. FIG. 1 shows the two side housing walls 3 and 4 which extend from the cylinder head bottom 2 as far as a top split surface 5 for supporting a cylinder head cover 6. At a distance from the cylinder head bottom 2, the housing walls are joined by a cylinder head 7 which separates a coolant space 8 from a control space 9 higher up. Those regions of the cylinder head bottom 2 which cover the cylinder openings are referred to as combustion space sections 10 and contain the entry openings of the gas exchange ducts.

The cylinder head according to certain preferred embodiments of the inventions is equipped with, for example, two inlet and two outlet ducts per cylinder. The inlet and outlet ducts respectively adjacent to one another in the longitudinal direction of the cylinder head 1 penetrate the coolant space 8 in a direction transverse to the cylinder head towards opposite sides. In FIG. 1, an inlet duct 11 and an outlet duct 12 are indicated by dotted lines. The inlet duct 11 extends from its entry opening 13 in the direction of the housing wall 3 and the outlet duct 12 extends from its entry opening 14 in the direction of the housing wall 4. The entry openings 13 and 14 are provided with valve seating rings and are controlled by gas exchange valves by two cam shafts 15 and 16 supported in the control space 9.

An auxiliary combustion chamber 17 located within the transverse central plane of the cylinder and in the peripheral region of the combustion chamber sections is cast between the inlet ducts of each cylinder in the cylinder head 1. A combustion duct 18 leads from each of the auxiliary combustion chambers 17 at an oblique angle in the direction of the cylinder. This combustion duct emerges in a land section, of the combustion space section 10, located between the entry openings 13 of the inlet ducts 11. The position of the auxiliary combustion chambers 17 between the inlet ducts 11 is selected in such a way that at least the upper parts of the chambers have coolant flowing all around them.

The auxiliary combustion chambers 17, thus isolated with at least their dome-shaped upper parts in the coolant space 8, are cast as one integral part with the cylinder head top 7 for stiffening purposes. So that the cooling of the outlet ducts 12 is not adversely affected by this, the cylinder head top 7 is set at an angle in the direction transverse to the cylinder head.

Corresponding to the run of the outlet ducts 12, the cylinder head top 7 has its greatest distance from the cylinder head bottom 2 in the region of the housing wall 4 and this distance decreases steadily towards the housing wall 3. The slope of the cylinder head top 7 set at an angle is fixed in such a way that the upper parts of the auxiliary combustion chambers 17 are immediately adjacent to the underside 19 of the cylinder head bottom 2 so that an overall increase in the cylinder head stiffness is achieved.

The housing wall 3 is provided with depressions, above the auxiliary combustion chambers, pointing towards the control space 9. This results in recesses 20, accessible from the outside; the top sections 21 of the cylinder head top 7 open towards the outside from the bottom of the recess. The top sections 21 are provided with tapped holes 22 emerging into the auxiliary combustion chambers 17 and the injection nozzles 23 are screwed into these holes. The nozzle body 24 protruding freely into the recesses 20 is located within the outline of the cylinder head housing so that a compact construction is achieved.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Cylinder head for air-compressing, self-ignition fuel-injection internal combustion engines with several cylinders, comprising:
   a cylinder head bottom having substantially planar combustion space sections;
   a coolant space extending from the cylinder head bottom to the cylinder head top;
   inlet and outlet ducts penetrating the coolant space from an opening in each of the combustion space sections, the inlet and outlet ducts respectively extending towards opposite sides of the cylinder head each in a direction transverse to the longitudinal axis of the cylinder head;
   auxiliary combustion chambers located in a transverse center plane of the cylinder head extending between the inlet ducts in a region of a periphery of the combustion space section; and
   a cylinder head top which extends downwards at an angle across substantially an entire transverse width of the cylinder head in a direction transverse to the cylinder head towards the auxiliary combustion chambers in such a way that upper parts of the auxiliary combustion chambers directly touch a bottom side of the cylinder head top and are immediately adjacent to the cylinder head top.

2. Cylinder head according to claim 1, wherein combustion ducts extend from the auxiliary combustion chambers toward the direction of the combustion space sections and emerge in main lands between openings of the inlet valves into combustion spaces.

3. Cylinder head according to claim 1, wherein upper parts of the auxiliary combustion chambers are arranged in an isolated manner in the coolant space.

4. Cylinder head according to claim 3, wherein tapped holes, entering at an angle from the upper parts of the auxiliary combustion chamber into the auxiliary combustion chambers for accommodating injection nozzles whose nozzle bodies are located, so as to be accessible from the outside, within a lateral housing outline of the cylinder head.

5. Cylinder head according to claim 4, wherein a housing wall extending longitudinally above the auxiliary combustion chambers is provided with depressions forming recesses in which the nozzle bodies of the injection nozzles are arranged in an isolated manner.

* * * * *